US011029676B2

(12) United States Patent
Guo

(10) Patent No.: US 11,029,676 B2
(45) Date of Patent: Jun. 8, 2021

(54) SAFETY MONITORING METHOD AND APPARATUS FOR AN INDUSTRIAL CONTROL SYSTEM

(71) Applicant: Siemens Aktiengesellschaft, Munich (DE)

(72) Inventor: Dai Fei Guo, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 29 days.

(21) Appl. No.: 16/288,381

(22) Filed: Feb. 28, 2019

(65) Prior Publication Data
US 2019/0271975 A1 Sep. 5, 2019

(30) Foreign Application Priority Data

Mar. 1, 2018 (CN) .......................... 201810172798.6

(51) Int. Cl.
G05B 23/02 (2006.01)
G06F 3/0488 (2013.01)
(52) U.S. Cl.
CPC ..... G05B 23/0221 (2013.01); G05B 23/0216 (2013.01); G06F 3/0488 (2013.01)
(58) Field of Classification Search
CPC ............ G05B 23/0221; G05B 23/0216; G06F 3/0488
USPC ......................................................... 700/81
See application file for complete search history.

(56) References Cited

U.S. PATENT DOCUMENTS 4,298,955 A * 11/1981 Munday ............. G05B 23/0235
700/266
2004/0123137 A1 6/2004 Yodaiken
2012/0016607 A1* 1/2012 Cottrell ............. G05B 23/0229
702/62
(Continued)

FOREIGN PATENT DOCUMENTS

CN 1748203 A 3/2006
CN 102460529 A 5/2012
(Continued)

OTHER PUBLICATIONS

Extended European Search Report dated Jul. 3, 2019.
(Continued)

Primary Examiner — Jigneshkumar C Patel
(74) Attorney, Agent, or Firm — Harness, Dickey & Pierce, P.L.C.

(57) ABSTRACT

A safety monitoring method and apparatus for an industrial control system include an advantage of quick and accurate detection of an abnormal behavior in the industrial control system. An embodiment of the method includes: providing the first data generated during the process of operating of an industrial control system and performing the first statistics on the first data; providing a result of the first statistics to a user; obtaining an operation performed by the user on the result of the first statistics; determining, based on the operation, a target time period related to the first statistics and the second data satisfying a preset condition in the first data; and obtaining a result of second statistics in the target time period, and based on the result thereof, performing the safety analysis on the industrial control system.

7 Claims, 5 Drawing Sheets

(56) References Cited

U.S. PATENT DOCUMENTS

| | | | |
|---|---|---|---|
| 2012/0136629 A1 | 5/2012 | Tamaki et al. | |
| 2012/0242667 A1 | 9/2012 | Kaushal | |
| 2014/0283047 A1 | 9/2014 | Dixit et al. | |
| 2014/0344007 A1* | 11/2014 | Shende | G06Q 10/0635 705/7.27 |
| 2018/0284742 A1* | 10/2018 | Cella | G05B 13/028 |

FOREIGN PATENT DOCUMENTS

| | | |
|---|---|---|
| CN | 104052730 A | 9/2014 |
| CN | 104346571 A | 2/2015 |
| CN | 107493265 A | 12/2017 |
| CN | 107733905 A | 2/2018 |

OTHER PUBLICATIONS

European Office Action for European Patent Application No. 19160167.3 dated Apr. 22, 2020.
Office Action for Chinese Patent Application No. 201810172798.6 dated Mar. 31, 2021.
Office Action for Chinese Patent Application No. 201810172798.6 dated Mar. 31, 2021 and English translation thereof.

* cited by examiner

SAFETY MONITORING METHOD AND APPARATUS FOR AN INDUSTRIAL CONTROL SYSTEM

PRIORITY STATEMENT

The present application hereby claims priority under 35 U.S.C. § 119 to Chinese patent application number CN 201810172798.6 filed Mar. 1, 2018, the entire contents of which are hereby incorporated herein by reference.

FIELD

Embodiments of the invention generally relate to the field of industrial safety, in particular to embodiments of a safety monitoring method and/or apparatus for an industrial control system.

BACKGROUND

During the process of performing safety monitoring for an industrial control system, network flow and equipment log can be collected from the industrial control system and the abnormal behavior in the industrial control system can be analyzed using a rule-based automatic analysis engine. In the analysis thereof, the rule is normally preset, therefore only known attacks and abnormal behaviors can be identified, and the unknown attacks and abnormal behaviors cannot be identified.

Some techniques provide the analysis based on the characteristic of network flow. And the abnormal behavior in the industrial control system is analyzed by monitoring network flow.

SUMMARY

As the present technique needs to perform analysis on a large amount of network flow, the inventor has discovered that an abnormal behavior deviating from the baseline behavior is detected, the abnormal behavior will have existed for a long time, and a network attack may have occurred.

Example embodiments of the present invention provide a safety monitoring method and apparatus for an industrial control system that have the advantage of quick and accurate detection of an abnormal behavior in the industrial control system without being limited to the preset rule.

In a first embodiment, the invention provides a safety monitoring method for an industrial control system that can be performed by a safety monitoring apparatus, in which, the method is used for obtaining the first data, wherein the first data is data generated during the process of operating the industrial control system; for performing the first statistics on the first data, wherein the first statistics comprise time statistics compiled on at least one first characteristic of the first data, and the time statistics result of at least one first characteristic is used by a user to identify an abnormal behavior in the industrial control system; for providing a result of the first statistics for the user; for obtaining an operation performed by the user on the result of the first statistics; for determining, based on the operation, a target time period related to the first statistics and the second data satisfying a preset condition in the first data; for obtaining a result of the second statistics in the target time period, wherein the second statistics comprise time statistics compiled on at least one second characteristic of the second data, and a time statistics result of the at least one second characteristic is used by the user to analyze the abnormal behavior in the industrial control system; and for performing the safety analysis on the industrial control system based on the result of the second statistics in the target time period.

In a second embodiment, the invention provides a safety monitoring apparatus for an industrial control system that can perform the first embodiment or a method provided by any of the possible implementations of the first embodiment. The apparatus can comprise:

a data obtaining module, configured to obtain first data, wherein the first data is data generated during the process of operating the industrial control system; a data analyzing module, configured to perform the first statistics on the first data, wherein the first statistics comprise time statistics compiled on at least one first characteristic of the first data, a time statistics result of at least one first characteristic is used by a user to identify an abnormal behavior in the industrial control system; a user interface module, configured to provide a result of the first statistics for the user, and obtain an operation performed by the user on the result of the first statistics; the data analyzing module, further configured to determine, based on the operation, a target time period related to the first statistics and the second data satisfying a preset condition in the first data; obtain a result of the second statistics in the target time period, wherein the second statistics comprise time statistics compiled on at least one second characteristic of the second data, and a time statistics result of the at least one second characteristic is used by the user to analyze the abnormal behavior in the industrial control system; and perform the safety analysis on the industrial control system based on the result of the second statistics in the target time period.

In a third embodiment, the invention provides a safety monitoring apparatus for an industrial control system, comprising: at least one memory, configured to store machine-readable code; and at least one processor, configured to invoke the machine-readable code, to perform the first embodiment or a method provided by any of the possible implementations of the first embodiment.

In a fourth embodiment, the invention provides a machine-readable medium, wherein the machine-readable medium stores machine-readable code, and when the machine-readable code is invoked by at least one processor, performs the first embodiment or a method provided by any of the possible implementations of the first embodiment.

In another embodiment, the invention provides a safety monitoring method for an industrial control system, the method comprising:

obtaining first data, the first data being data generated during a process of operating the industrial control system;

performing first statistics on the first data, the first statistics including time statistics compiled on at least one first characteristic of the first data, time statistic results of at least one first characteristic being usable by a user to identify an abnormal behavior in the industrial control system;

providing a result of the first statistics to the user;

obtaining an operation performed by the user on the result of the first statistics;

determining, based on the operation performed, a target time period related to the first statistics and second data satisfying a preset condition in the first data;

obtaining a result of second statistics in the target time period, the second statistics including time statistics compiled on at least one second characteristic of the second data, a time statistic result of the at least one second characteristic being usable by the user to analyze the abnormal behavior in the industrial control system; and performing a safety analysis on the industrial control system based on the result of the second statistics in the target time period.

In another embodiment, the invention provides a safety monitoring apparatus for an industrial control system, comprising:

a data obtaining module, configured to obtain first data, wherein the first data is data generated during a process of operating the industrial control system;

a data analyzing module, configured to perform first statistics on the first data, wherein the first statistics include a time statistic performed on at least one first characteristic of the first data, a time statistic result of at least one first characteristic being usable by a user to identify an abnormal behavior in the industrial control system; and a user interface module, configured to provide a result of the first statistics for the user, and obtain an operation performed by the user on a result of the first statistics;

the data analyzing module being further configured to:
  determine, based on the operation, a target time period related to the first statistics and the second data satisfying a preset condition in the first data;
  obtain a result of the second statistics in the target time period, wherein the second statistics include a time statistic performed on at least one second characteristic of the second data and a time statistic result of the at least one second characteristic being usable by the user to analyze the abnormal behavior in the industrial control system; and
  perform a safety analysis on the industrial control system based on the result of the second statistics in the target time period.

In another embodiment, the invention provides a safety monitoring apparatus for an industrial control system, comprising:

at least one memory, configured to store machine-readable code; and at least one processor, configured to invoke the machine-readable code, to perform safety monitoring including:
  obtaining first data, the first data being data generated during a process of operating the industrial control system,
  performing first statistics on the first data, the first statistics including time statistics compiled on at least one first characteristic of the first data, time statistic results of at least one first characteristic being usable by a user to identify an abnormal behavior in the industrial control system,
  providing a result of the first statistics to the user,
  obtaining an operation performed by the user on the result of the first statistics,
  determining, based on the operation performed, a target time period related to the first statistics and second data satisfying a preset condition in the first data,
  obtaining a result of second statistics in the target time period, the second statistics including time statistics compiled on at least one second characteristic of the second data, a time statistic result of the at least one second characteristic being usable by the user to analyze the abnormal behavior in the industrial control system, and
  performing a safety analysis on the industrial control system based on the result of the second statistics in the target time period.

LIST OF SYMBOLS IN THE ATTACHED FIGURES

Figure 1:
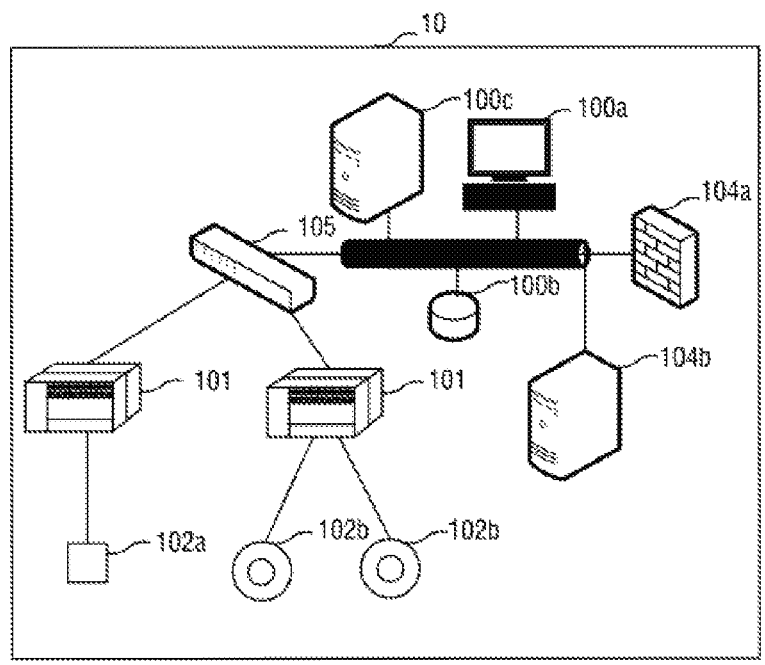
FIG. 1 is a schematic diagram of the structure of an industrial control system.

| | | |
|---|---|---|
| 10: industrial control system | 20: safety monitoring apparatus | |
| 101: industrial controller | 102a: sensor | 102b: motor |
| 100a: engineer station | 100b: database server | 100c: application server |
| 104a: firewall | 104b: server for intrusion detection | 105: network switching and routing equipment |
| 200: network sensor | | |
| 301: first data | 302: second data | 401: a result of the first statistic |
| 402: a result of safety analysis | 601: target time period | 501: user's operation |
| 502: preset condition | 701: statistical rule of the first characteristic | 702: statistical rule of the second characteristic |
| 201: data obtaining module | 202: data analyzing module | 203: user interface module |
| 2021: preprocessing submodule | 2022: the first statistic submodule | 2023: data range determining submodule |
| 2024: the second statistic submodule | 2031: the statistic result providing submodule | 2032: operation obtaining module |
| 207: network interface | 204: at least one memory | 205: at least one processor |
| 206: user interface | | |
| S301: data obtaining | S302: the first statistic | S303: providing a result of the first statistic |
| S304: obtaining user's operation | S305: determining the range of the second statistic | S306: obtaining a result of the second statistic |
| S307: safety analysis | S308: providing a result of safety analysis | |
| P1, P2 and P3: protocol types | | |
| S501: obtaining network flow | S502: preprocessing | S503: performing time statistics |
| S504: displaying a result of the first statistic | S505: receiving user's operation | S506: identifying user's operation |
| S507: obtaining a result of the second statistic | S508: determining the deviation level of the result of the second statistic for safety analysis | |

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In a first embodiment, the invention provides a safety monitoring method for an industrial control system that can be performed by a safety monitoring apparatus, in which, the method is used for obtaining the first data, wherein the first data is data generated during the process of operating the industrial control system; for performing the first statistics on the first data, wherein the first statistics comprise time statistics compiled on at least one first characteristic of the first data, and the time statistics result of at least one first characteristic is used by a user to identify an abnormal behavior in the industrial control system; for providing a result of the first statistics for the user; for obtaining an operation performed by the user on the result of the first statistics; for determining, based on the operation, a target time period related to the first statistics and the second data satisfying a preset condition in the first data; for obtaining a result of the second statistics in the target time period, wherein the second statistics comprise time statistics compiled on at least one second characteristic of the second data, and a time statistics result of the at least one second characteristic is used by the user to analyze the abnormal behavior in the industrial control system; and for performing the safety analysis on the industrial control system based on the result of the second statistics in the target time period.

First, the method for performing time statistics on data is applicable to the industrial control system. In the method thereof, in view of certainty of the behavior in the industrial control system, the time statistics are performed on the data generated during the process of operating the industrial control system, and whether there is an abnormal behavior in the industrial control system is determined by observing the change in the behavior in the industrial control system over time. A full consideration has been given to the characteristics of the industrial control system.

Furthermore, the statistic is first performed for the first characteristic that is used by a user to identify the abnormal behavior in the industrial control system to enable the user to easily find the abnormal behavior in the system. Whether the analysis has been further performed and the data range for further analysis are then selected by a user who can judge the abnormal behavior that has not occurred in the past as their judgment is not limited to the preset rule. After the user selects the further analysis, the statistic will be then performed for the second characteristic that is used by a user to identify the abnormal behavior in the industrial control system to perform a safety analysis based on the result of the statistic. In order to reduce the amount for data processing in the safety analysis, and the automatic analysis and the user's judgment are combined to obtain more accurate and more efficient analysis result.

Optionally, when providing a result of the first statistic to the user, it is possible to display the result of the first statistic to the user on a touchscreen, and when obtaining the operation performed by the user on the result of the first statistics, it is possible to obtain a touch operation performed, on the touchscreen, by the user on the displayed result of the first statistics.

By screen display, the result of the first statistic can be visually displayed to the user, which makes it convenient for the user to make a judgment, and receiving the user's operation with a touchscreen makes it simple and convenient for the user to use.

Optionally, when performing a safety analysis on the industrial control system based on the result of the second statistic in the target time period, it is possible to compare the result of the second statistics in the target time period with a result of the second statistics in at least one previous time period corresponding to the target time period, and determine, based on a comparison result, whether a safety event happens in the industrial control system in the target time period.

As described herein, a full consideration is also given to the certainty of the behavior of the industrial control system, and comparing the result of the statistics in the current time period with a result in the previous time period will make it easier to obtain an accurate result of safety analysis.

Specifically, when comparing the result of the second statistics in the target time period with a result of the second statistics in at least one previous time period corresponding to the target time period, it is possible to determine, for each of at least one second characteristic, the deviation level between the result of the second statistics in the target time period and the result of the second statistics in at least one previous time period corresponding to the target time period. When determining, based on the comparison result, whether a safety event happens in the industrial control system in the target time period, it is possible to perform a weighted calculation on the deviation level corresponding to at least one second characteristic to obtain an overall deviation level, and if the overall deviation level is greater than a preset overall deviation level threshold, determine that a safety event happens in the industrial control system in the target time period, or otherwise, determine that no safety event happens in the industrial control system in the target time period.

Here, a method for automatically performing safety analysis is provided, in which by weighted calculation, the degree of influence of a plurality of second characteristics on the safety analysis result can be adjusted. When the overall statistic result deviates significantly from the previous statistical result, determined that a safety event happens.

In a second embodiment, the invention provides a safety monitoring apparatus for an industrial control system that can perform the first embodiment or a method provided by any of the possible implementations of the first embodiment. The apparatus can comprise:

a data obtaining module, configured to obtain first data, wherein the first data is data generated during the process of operating the industrial control system; a data analyzing module, configured to perform the first statistics on the first data, wherein the first statistics comprise time statistics compiled on at least one first characteristic of the first data, a time statistics result of at least one first characteristic is used by a user to identify an abnormal behavior in the industrial control system; a user interface module, configured to provide a result of the first statistics for the user, and obtain an operation performed by the user on the result of the first statistics; the data analyzing module, further configured to determine, based on the operation, a target time period related to the first statistics and the second data satisfying a preset condition in the first data; obtain a result of the second statistics in the target time period, wherein the second statistics comprise time statistics compiled on at least one second characteristic of the second data, and a time statistics result of the at least one second characteristic is used by the user to analyze the abnormal behavior in the industrial control system; and perform the safety analysis on the industrial control system based on the result of the second statistics in the target time period.

First, the method for performing time statistics on data is applicable to the industrial control system. In the method thereof, in view of certainty of the behavior in the industrial control system, the time statistic is performed on the data generated during the process of operating the industrial control system, and whether there is an abnormal behavior in the industrial control system is determined by observing the change in the behavior in the industrial control system over time. A full consideration has been given to the characteristics of the industrial control system.

Furthermore, the statistic is first performed for the first characteristic that is used by a user to identify the abnormal behavior in the industrial control system to enable the user to easily find the abnormal behavior in the system. Whether the analysis has been further performed and the data range for further analysis are then selected by a user who can judge the abnormal behavior that has not occurred in the past as their judgment is not limited to the preset rule. After the user selects the further analysis, the statistic will be then performed for the second characteristic that is used by a user to identify the abnormal behavior in the industrial control system to perform a safety analysis based on the result of the statistic. In order to reduce the amount for data processing in the safety analysis, and the automatic analysis and the user's judgment are combined to obtain more accurate and more efficient analysis results.

Optionally, when providing the result of the first statistics to a user, the user interface module is specifically configured to display the result of the first statistics to the user on a touchscreen, and when obtaining the operation performed by the user on the result of the first statistics, the user interface module is specifically configured to obtain a touch operation performed, on the touchscreen, by the user on the displayed result of the first statistics.

By screen display, the result of the first statistic can be visually displayed to the user, which makes it convenient for the user to make a judgment, and receiving the user's operation with a touchscreen makes it simple and convenient for the user to use.

Optionally, when performing a safety analysis on the industrial control system based on the result of the second statistic in the target time period, the data analyzing module is specifically configured to compare the result of the second statistics in the target time period with a result of the second statistics in at least one previous time period corresponding to the target time period; and determine, based on a comparison result, whether a safety event happens in the industrial control system in the target time period.

As described herein, a full consideration is also given to the certainty of the behavior of the industrial control system, and comparing the result the statistics in the current time period with a result of in the previous time period will make it easier to obtain an accurate result of safety analysis.

Optionally, when comparing the result of the second statistics in the target time period with the result of the second statistics in at least one previous time period corresponding to the target time period, the data analyzing module is specifically configured to: determine, for each of the at least one second characteristic, the deviation level between the result of the second statistics in the target time period and the result of the second statistics in at least one previous time period corresponding to the target time period; when determining, based on the comparison result, whether a safety event happens in the industrial control system in the target time period, the analyzing module is specifically configured to perform a weighted calculation on the deviation level corresponding to at least one second characteristic to obtain an overall deviation level; and if the overall deviation level is greater than a preset overall deviation level threshold, determine that a safety event happens in the industrial control system in the target time period, or otherwise, determine that no safety event happens in the industrial control system in the target time period.

Here, a method for automatically performing safety analysis is provided, in which by weighted calculation, the degree of influence of a plurality of second characteristics on the safety analysis result can be adjusted. When the overall statistic result deviates significantly from the previous statistical result, it is determined that a safety event happens.

In a third embodiment, the invention provides a safety monitoring apparatus for an industrial control system, comprising: at least one memory, configured to store machine-readable code; and at least one processor, configured to invoke the machine-readable code, to perform the first embodiment or a method provided by any of the possible implementations of the first embodiment.

In a fourth embodiment, the invention provides a machine-readable medium, wherein the machine-readable medium stores machine-readable code, and when the machine-readable code is invoked by at least one processor, performs the first embodiment or a method provided by any of the possible implementations of the first embodiment.

As described above, when performing an analysis for an abnormal behavior in the industrial control system based on an automatic analysis engine, as the rule is normally preset, only known attacks and abnormal behaviors can be identified while the unknown attacks and abnormal behaviors cannot be identified. The method for automatic analysis based on network traffic flow, however, does not have a good real-time performance in abnormal behavior detection as a large amount of network flow needs to be analyzed.

In an example of the present invention, the time statistics is performed for the data generated during the processing of operating the industrial control system, and when performing the statistics, distinguish two types of characteristics, during which, the statistic is first performed on the characteristic used by the user to easily determine the abnormal behavior so as to provide the statistical result to the user to quickly make a judgment, and then the data range related to the abnormal behavior selected by the user's operation is determined to further perform the statistics on the data within the range, and the statistical characteristic is used for in-depth analysis of the abnormal behavior. With the two-part statistics along with the user's judgment, the amount of data for processing in the safety analysis is reduced with more accurate and more efficient analysis result, and the abnormal behavior that has not occurred in the past can be identified without relying on rule setting.

In order to understand the example embodiments of the present inventions, the industrial control system will be first be described as follows.

An Industrial Control System (ICS) is configured to achieve automatic control of the industrial process. An industrial control system can be a wind power system, an automobile manufacturing shop, a pharmaceutical plant, a city sewage treatment system, or the like.

The traditional industrial control system is closed, where the external attacks will be difficult to pose a safety threat to key equipment such as an industrial controller in the industrial control system; and therefore, a traditional industrial control system has low requirements for network safety. The modern industrial control system utilizes a large number of network technologies and commercial components, and can be connected to other networks including the Internet, where the external network attacks may tamper with the control process of the industrial controller, resulting in damage to industrial equipment and seriously affecting normal operation of the industrial control system. Therefore, how to avoid external network attacks becomes especially important.

In order to effectively resist external network attacks and safeguard the key industrial control system and the control process thereof, a feasible method is to first monitor the network safety of the industrial control system and identify possible network attacks, i.e., possible safety events.

FIG. 1 shows a schematic diagram of an industrial control system 10 that can comprise:

at least one industrial controller 101, wherein the industrial controller 101 can include, but is not limited to, a Programmable Logic Controller (PLC), a Programmable Automation Controller (PAC), or the like, at least one field equipment, such as sensor 102a, motor 102b, or the like, wherein the sensor 102a can obtain the field data such as temperature, humidity, pressure, liquid flow rate, etc. under the control of the industrial controller 101, and the motor 102b can drive motion under the control of the industrial controller 101, at least one industrial host, such as an Engineer Station (ES) 100a, an Operator Station (OS), a Human Machine Interface (HMI), a database server 100b, an application server 100c, or the like, at least one safety protection equipment, such as a firewall 104a, a server for intrusion detection 104b, or the like, wherein the safety fire prevention equipment such as the firewall 104a and the server for intrusion detection 104b may also form an Intrusion Detection System (IDS) to realize the intrusion detection of the industrial control system 10, and at least one piece of network switching and routing equipment 105, such as an industrial switch, an industrial router, or the like. These network switching and routing equipment 105 can form an industrial Ethernet network that achieves the interconnection of the internal equipment of the industrial control system 10.

Next, the manner of performing safety monitoring of an industrial control system using a safety monitoring apparatus according to an example embodiment of the present invention will be described with reference to FIG. 2. Wherein the safety monitoring apparatus 20 captures data generated during the process of operating the industrial control system 10, such as the first data 301, using an equipment, such as a network sensor 200. The first data 301 may comprise the network flow and may also comprise equipment logs that may come from safety protection equipment, an industrial host, network switching and routing equipment 105, or the like, in the industrial control system 10. Log types may include: safety log, application log, system log, operation log, or the like. The safety monitoring apparatus 20 can receive data from a network sensor 200 via a network interface 207 and store it in at least one memory 204, and the statistics and analysis are performed by at least one processor 205 for the data stored in at least one memory 204 via a code for a safety monitoring method provided by implementing an example of the present invention. Wherein the code for a safety monitoring method provided by executing an example of the present invention may also be stored in at least one memory 204 that is used as a machine-readable medium on which the machine-readable code can be stored, and when invoked by at least one processor 205, the machine can execute the safety monitoring method provided by an example of the present invention. The results of the statistics and analysis can be provided to the user via a user interface 206 (e.g., a touchscreen) and the user's operation on the statistical results can be received via the user interface 206.

Wherein, the machine-readable code may comprise the following program modules:

a data obtaining module 201, configured to obtain the data generated during the process of operating the industrial control system 10;

a data analyzing module 202, configured to perform statistics and analysis on the data obtained by the data obtaining module 201; and a user interface module 203, configured to provide a result of the statistic to the user, and receive user's operation.

Figure 2:
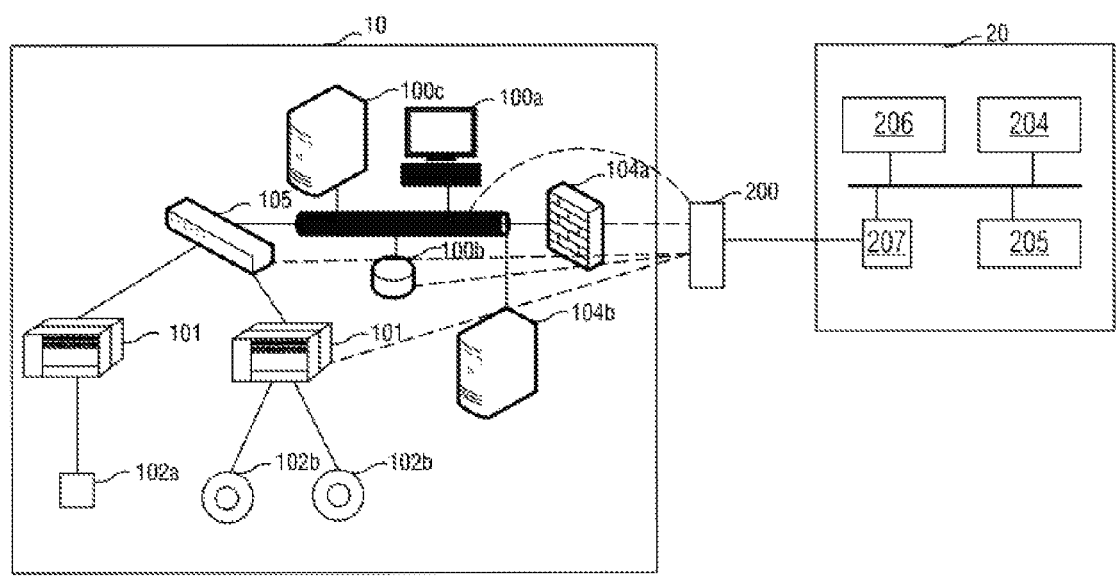
FIG. 2 is a schematic diagram of performing safety monitoring of an industrial control system using a safety monitoring apparatus according to an example embodiment of the present invention.

The dashed lines in FIG. 2 show the optional locations of capturing data by the safety monitoring apparatus 20 from the industrial control system 10, for example: at the firewall 104a, at the core network switching and routing equipment, between the industrial controller 101 and the industrial host, at the industrial controller 101, at the database server 100b, or the like.

Figure 3:
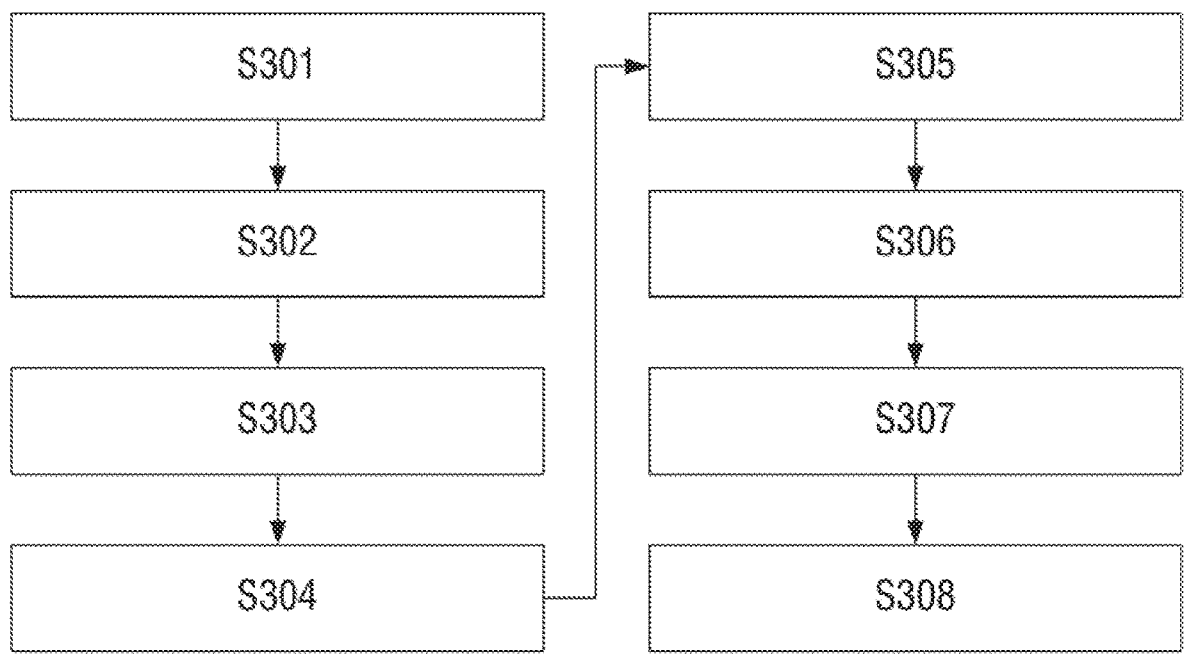
FIG. 3 is a flowchart of a safety monitoring method provided in an example embodiment of the present invention.

Next, the process of performing safety monitoring of an industrial control system 10 using a safety monitoring apparatus 20 according to an example of the present invention will be described with reference to FIG. 3. As shown in FIG. 3, the process may comprise the following steps:

S301: data obtaining.

The data generated during the process of operating the industrial control system 10 that is obtained by the safety monitoring apparatus 20, is recorded herein as "the first data 301". The safety monitoring apparatus 20 may cache the obtained data in its own memory, for example, in at least one aforementioned memory 204, and may also be stored on an external storage resource, for example, in a cloud or a database server.

S302: the first statistic.

The safety monitoring apparatus 20 performs a statistic on the first data 301, wherein the statistic performed in step S302 is recorded as "the first statistic" in order to distinguish it from the subsequent statistics. The statistics performed in steps S305 and S306 are recorded as the "second statistics".

In the example embodiments of the present invention, in view of certainty of the behavior in the industrial control system, the behavior in an industrial control system changes regularly over time. Therefore, in the examples of the present invention, the time statistic is performed on the data generated during the process of operating the industrial control system, and whether there is an abnormal behavior in the industrial control system is determined by observing the change in the behavior in the industrial control system over time. Full consideration of the characteristics of the industrial control system is effective in determining the abnormality in the industrial control system.

Wherein, the first statistic comprises a time statistic performed on at least one first characteristic of the first data 301, and the time statistical result of at least one first characteristic is used by a user to identify an abnormal behavior in the industrial control system 10.

For example, in the case where the first data 301 comprises the network flow, at least one first characteristic may comprise the flow rate, the proportion of the flow of various network protocols in the first data 301, or the like. The user can easily identify an abnormal behavior based on the change in the flow rate over time, for example, if the flow increases significantly during a certain period of time, an abnormal behavior such as a Transmission Control Protocol (TCP) flood attack may occur. The user can also easily identify an abnormal behavior based on the proportion of flow in various network protocols. For example, under normal circumstances, the network flow of Protocol A, Protocol B, Protocol C and Protocol D accounts for approximately 20%, 30%, 45% and 5% among the total network flow. During a certain period of time, the proportion of the flow of protocol D increases significantly among the total network flow, for example, during this time period, when the proportion of each protocol flow accounts for 10%, 17%, 20% and 43% among the total respectively, the user can preliminarily determine that an abnormal behavior may occur.

Wherein, the obtained data needs to be preprocessed, for example, identifying the type of network protocol used for the data, in order to achieve the statistics of some characteristics.

At the time of statistics, the statistics may be performed based on the preset statistical rules 701 of the first characteristic, and these rules 701 may be stored in the characteristic rule base.

S303: providing a result 401 of the first statistic.

Figure 6:
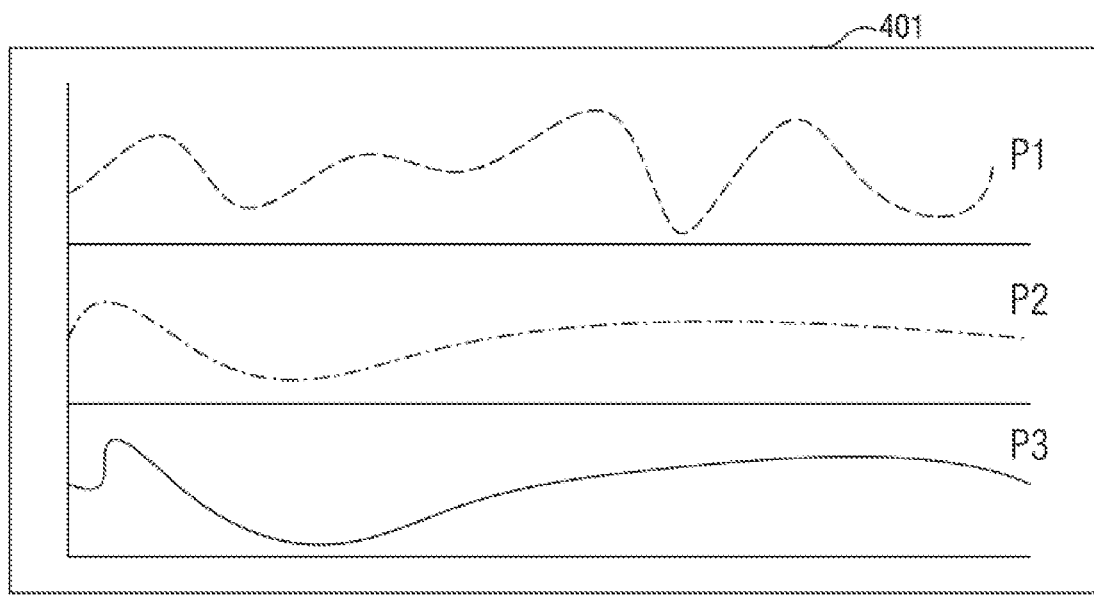
FIGS. 6 and 7 are the schematic diagrams of the statistical results in an example embodiment of the present invention.
Figure 7:
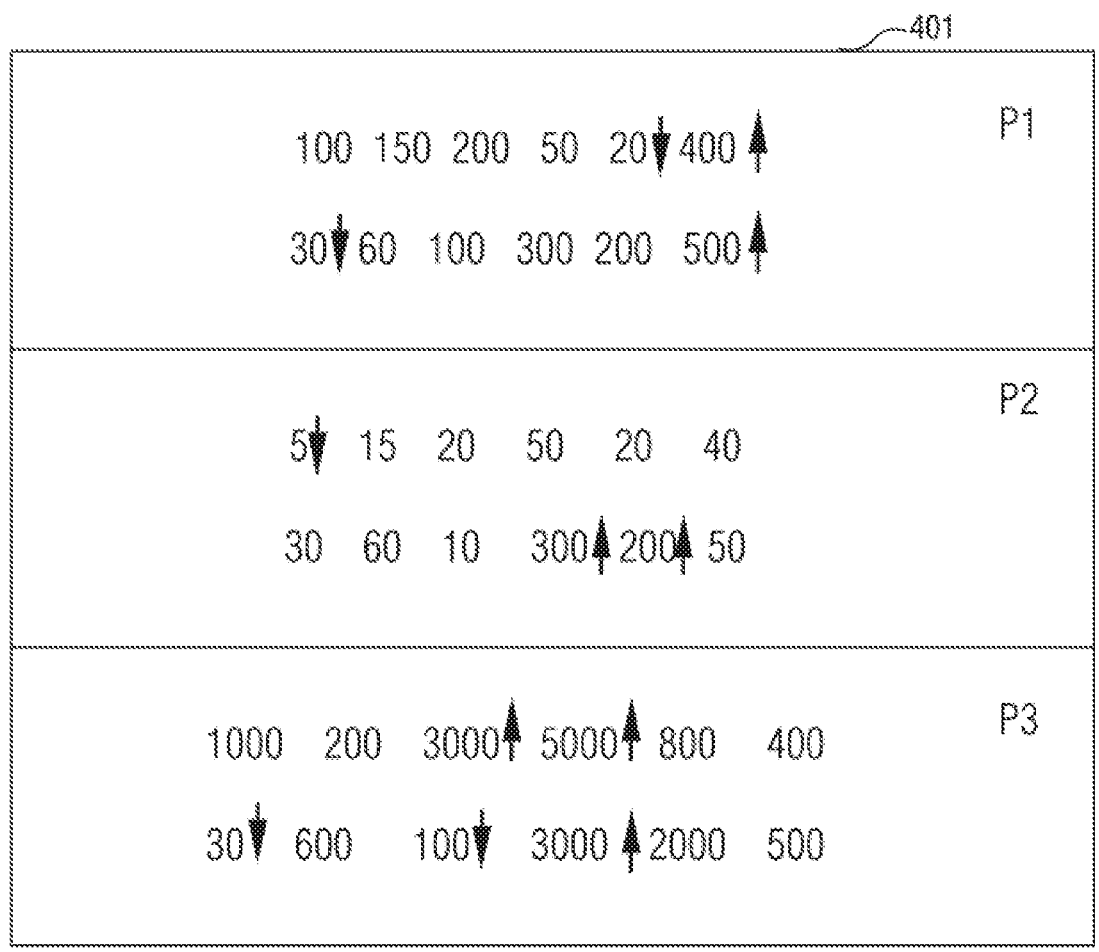

The safety monitoring apparatus 20 can provide the result 401 of the first statistic to the user via the aforementioned user interface 206. There are various ways in which the safety monitoring apparatus 20 provides the statistical results. Take the statistics of the flow of the number of different network protocols as an example. The statistical results can be displayed graphically as shown in FIG. 6. The graph shows the results of time statistics of the flow rates of the network protocol P1 (the dashed line in the upper part), network protocol P2 (the dotted line in the middle part) and network protocol P3 (the solid line in the lower part). The statistical results can be displayed as a report as shown in FIG. 7. The upper and lower limits of the flow threshold can be preset, and the statistical values over the upper limit and below the lower limit are displayed in a manner different from that for other values. The statistic values over the upper limit are marked with an "upward arrow" and the statistic values below the lower limit are marked with a "downward arrow", and the flow threshold may be different for the different protocol types. Furthermore, the statistical results may be also provided by means of an audible prompt, or the upper and lower limits may be preset for the flow threshold, so that the user is easily prompted with an audible sound in case of being over the upper limit or below the lower limit. Alternatively, the statistical results are provided by combining the audible prompt and the graphic display to remind the user to determine the abnormal behavior.

S304: obtaining an operation 501 performed by the user on the result 401 of the first statistic.

In step S303, after a user is provided with the result 401 of the first statistic by the safety monitoring apparatus 20, the user may make a preliminary judgment on the result; if the industrial control system 10 is suspected of an abnormal behavior, the operation 501 may be performed on the result 401 of the first statistic, and an in-depth analysis will be performed on the possible abnormal behavior to determine whether a safety event occurs with the industrial control system 10.

Figure 8:
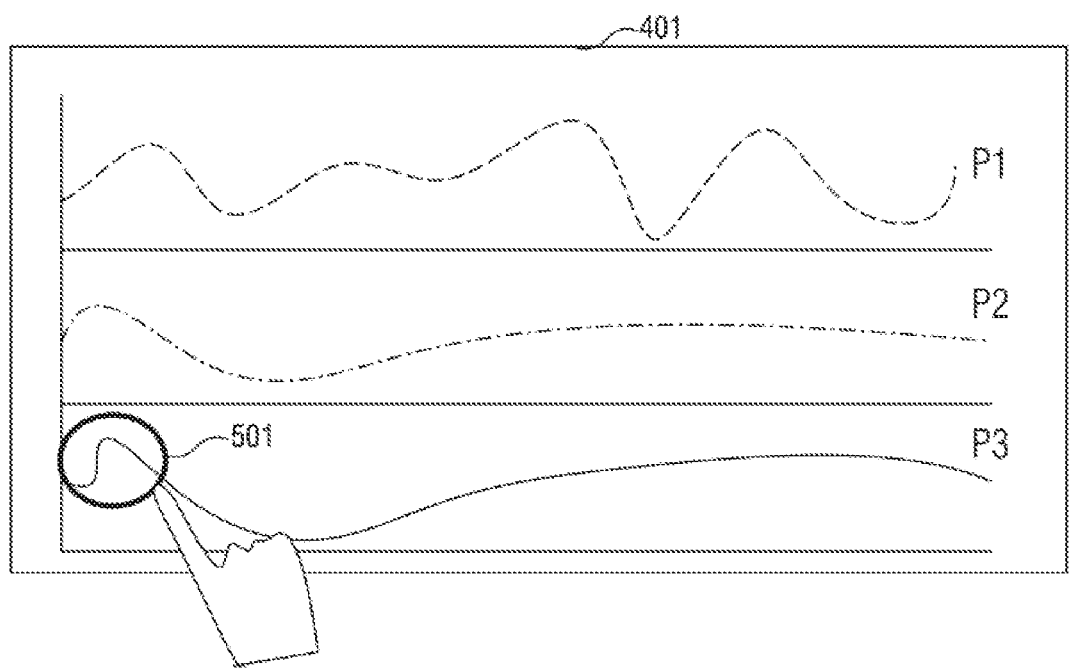
FIGS. 8 and 9 are the schematic diagrams of an operation performed by a user in an example embodiment of the present invention.
Figure 9:
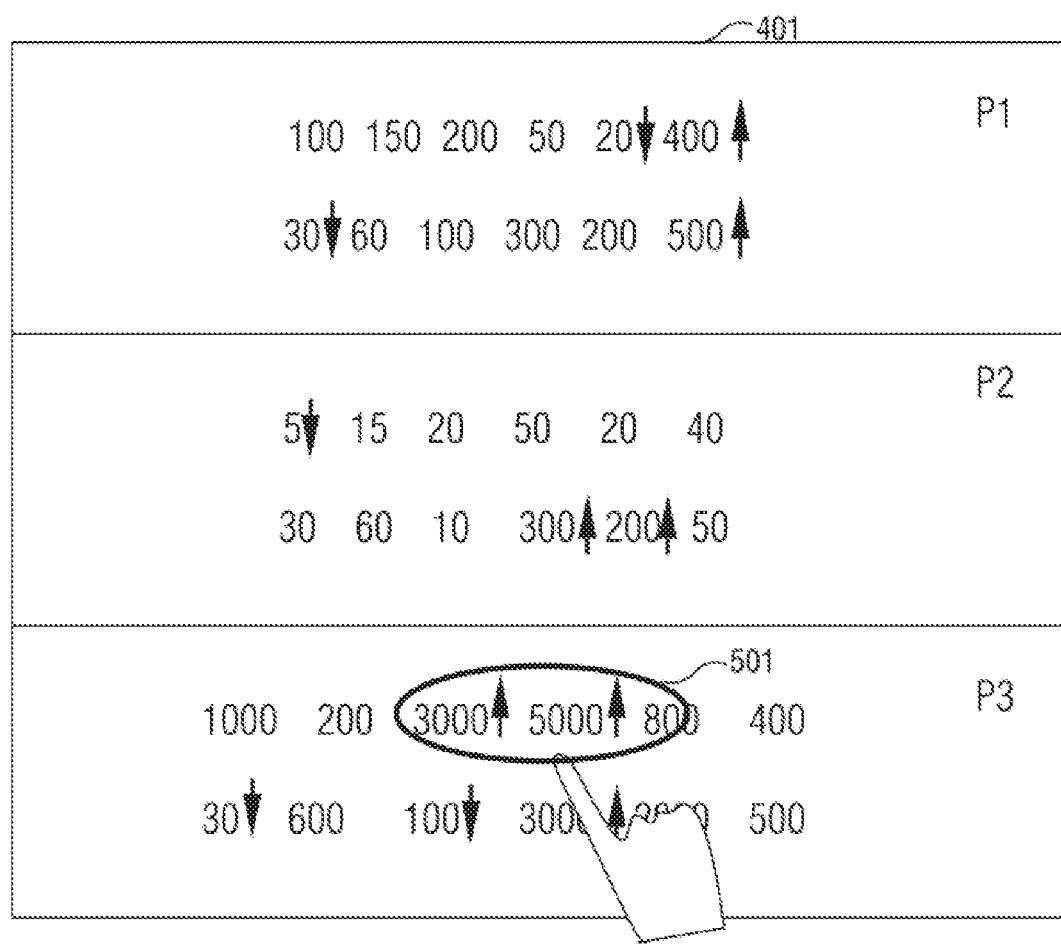

For example, in step S303, the safety monitoring apparatus 20 displays the result 401 of the first statistic to the user via the touchscreen as the user interface 206, and the user can operate the result 401 of the first statistic on the touchscreen and the part with abnormal behavior can be circled out on the screen as shown in the FIGS. 8 and 9. The safety monitoring apparatus 20 can obtain the touch operation performed by the user for the result 401 of the first statistic via the touchscreen.

S305: determining the range of the second statistic.

The safety monitoring apparatus 20 determines, based on operation 501, a target time period 601 related to the first statistic, for example, 1:30 to 1:45 AM, and the second data 302 satisfying a preset condition 502 in the first data 301, for example, as shown in FIG. 8; when the user selects the area where the graph of the network protocol P3 is located, the safety monitoring apparatus 20 will determine that the user needs to further make an in-depth analysis on the data of the network protocol P3. Optionally, the user can also enter the present condition 502 as promoted by a prompt box, for example, the network protocol P2 has a flow rate of above 100 KB/S.

S306: obtaining a result of the second statistic of the target time period 601.

Wherein, the second statistic comprises a time statistic performed on at least one second characteristic of the second data 302, and the time statistical result of at least one second characteristic is used by a user to analyze an abnormal behavior in the industrial control system 10.

For example, in the case where the first data 301 includes the network flow, at least one second characteristic may comprise the retransmission rate, the packet loss rate, the ratio of sensitive operation in industrial control, or the like.

Wherein, in order to achieve some statistics of the second characteristic, the obtained data may also need to be preprocessed, for example, identifying the information such as the type of the industrial protocol related to the application layer data in the protocol and the type of the industrial control operation included in the application layer data so as to perform statistics on the sensitive operation in the industrial operations.

At the time of statistics, the statistics may also be performed based on the preset statistical rules 702 of the second characteristic, for example, which industrial control operations being sensitive operations, specific attack operation instructions, and specific attack flow sequences. The statistical rules 702 of the second characteristic may also be stored in the characteristic rule base.

S307: safety analysis.

The safety monitoring apparatus 20 performs the safety analysis on the industrial control system 10 based on the result of the second statistic in the target time period 601.

An optional implementation is that the safety monitoring apparatus 20 provides the result of the second statistic obtained in step S306 to the user, and the user, based on the result thereof, performs the safety analysis to determine whether a safety event has occurred; optionally, if a safety event occurs, the user may also, based on the result 401 of the first statistic and/or the result of the second statistic, determine what type of safety event has occurred, and which equipment in the industrial control system 10 are involved.

Another optional implementation is that whether a safety event has occurred is determined by the safety monitoring apparatus 20 based on the result of the second statistic. Optionally, if the safety monitoring apparatus 20 determines that a safety event has occurred, it may further determine which equipment inside or outside the industrial control system 10 are related to the safety event, for example, the sending equipment for a TCP message can be determined based on the source IP address in the message, and the sending equipment may be the attack source of the network attack. For another example, what type of equipment related to the safety event may be determined based on the industrial protocol related to the data application layer, for example, a PLC. In determining whether a safety event has occurred, the safety monitoring apparatus 20 may compare the result of the second statistic in the target time period 601 with a result of the second statistic in at least one previous time period corresponding to the target time period 601. For example, if the target time period 601 is 1:30 to 1:45 AM on Jan. 20, 2018, at least one previous time period corresponding to the target time period 601 may be 1:30 to 1:45 AM on Jan. 19, 2018; optionally, it may also include the same time period on the previous several days.

The safety monitoring apparatus 20 determines, based on a comparison result, whether a safety event occurs in the industrial control system 10 in the target time period 601. For example, the safety monitoring apparatus 20 may determine, for each of the at least one second characteristic, the deviation level between the result of the second statistic in the target time period 601 and the result of the second statistic in at least one previous time period corresponding to the target time period 601; perform a weighted calculation on the deviation level corresponding to at least one second characteristic to obtain an overall deviation level; and if the overall deviation level is greater than a preset overall deviation level threshold, determine that a safety event occurs in the industrial control system 10 in the target time period 601, or otherwise, determine that no safety event occurs in the industrial control system 10 in the target time period 601.

The method of performing the safety analysis with the safety monitoring apparatus 20 will be described with two examples below.

Example 1. No Safety Events have Occurred

Based on the result 401 of the first statistic, the flow rate of the network protocol P2 is low in the target time period 601 (1:30 to 1:45 AM on Jan. 20, 2018), and the user performs an operation on the result 401 of the first statistic, and selects the target time period 601 and the network protocol P2. The safety monitoring apparatus 20 further performs the statistics on at least one second characteristic (C21 retransmission rate, C22 packet loss rate, and C23 the ratio of sensitive operation in industrial control). In the target time period 601, the values of the three characteristics, which may be statistical mean values of the time period, are taken as:

C21=5%;
C21=1%;
C23=1.5%.

In the target time period 601 corresponding to 1:19 AM to 1:45 AM on Jan. 19, 2018, the values of the three characteristics are taken as:

C21'=0.1%;
C22'=0.1%; and
C23'=1%.

The deviation levels corresponding to the three second characteristics are:

D21=(5%−0.1%)/0.1%=4900%;
D22=(1%−0.1%)/0.1%=900%; and
D23=(1.5%−1%)/1%=50%.

The preset weighing factors for C21, C22 and C23 are:

w1=−1;
w2=−1; and
w3=10.

The overall deviation level threshold (D_Total_Th) is preset as 20. If the overall deviation level (D_Total) is greater than 20, determine that a safety event has occurred in the industrial control system 10, and if D_Total is 20 or less, determine that no safety events have occurred in the industrial control system 10.

In the case described herein, D_Total=w1*D21+ w2*D22+w3*D23=−1*4900%+(−1)*900%+10*50%=− 53<20, determine that no safety events have occurred.

Example 2. A Safety Event has Occurred

For example, based on the result 401 of the first statistic, the flow rate of the network protocol P2 is high in the target time period 601 (2:30 AM to 2:45 AM on Jan. 20, 2018), and the user performs an operation on the result 401 of the first statistic, and selects the target time period 601 and the network protocol P2. The safety monitoring apparatus 20 further performs the statistics on at least one second characteristic (C21 retransmission rate, C22 packet loss rate, and C23 the ratio of sensitive operation in industrial control). In the target time period 601, the values of the three characteristics, which may be statistical mean values of the time period, are taken as:

C21=0.15%;
C22=0.08%; and
C23=10%.

In the target time period 601 corresponding to 2:30 AM to 2:45 AM on Jan. 19, 2018, the values of the three characteristics are taken as:

C21'=0.12%;
C22'=0.1%; and
C23'=1%.

The deviation levels corresponding to the three second characteristics are:

D21=(0.15%−0.12%)/0.12%=25%;
D22=(0.08%−0.1%)/0.1%=−20%; and
D23=(10%−1%)/1%=900%.

The preset weighing factors for C21, C22 and C23 are:

w1=−1;
w2=−1; and
w3=10.

The overall deviation level threshold (D_Total_Th) is preset as 20. If the overall deviation level (D_Total) is greater than 20, determine that a safety event has occurred in the industrial control system 10, and if D_Total is 20 or less, determine that no safety events have occurred in the industrial control system 10.

In the case described herein, D_Total=w1*D21+ w2*D22+w3*D23=−1*25%+(−1)*(−20%)+10*(900%) =89.95>20, determine that a safety event has occurred.

In the Analysis Example 1, a possible condition is that when the network transmission quality is poor in the industrial control system 10, it may result in a low flow rate, and a high retransmission rate and packet loss rate, and if the ratio of sensitive operation in industrial control is not significantly different from that in the previous time period, it can be considered that no safety events occur, wherein the safety event is an event that threatens the safety of the industrial control system 10, for example, a network attack from outside or inside the industrial control system 10.

In the Analysis Example 2, a possible condition is that when the rate of the sensitive operation in the industrial control in the industrial control system 10 deviates greatly from that in the previous time period, it will be considered that a safety event has occurred.

S308: providing a result 402 of safety analysis.

A result 402 of the safety analysis obtained in step S307 may comprise any one or more of the following information:

1) Whether a safety event has occurred in the industrial control system 10;
2) A result of the first statistic 401;
3) A result of the second statistic; and
4) Information about equipment inside and/or outside the industrial control system 10 involved.

The safety monitoring apparatus 20, based on the result of the second statistic, provides the result of the safety analysis obtained in step S307 to the user. After determining, the user may enter the determination result to the safety monitoring apparatus 20, and the safety monitoring apparatus 20 may record the determination result entered by the user, the result of the corresponding first statistic 401 and the second statistic; optionally, the equipment inside and/or outside the industrial control system 10 involved may also be included. These recorded contents 402 can be stored in at least one memory 204 of the safety monitoring apparatus 20, or in a memory outside the safety monitoring apparatus 20, and can also be printed for review by a user. The recorded contents 402 can also be used in the safety analysis of the industrial control system 10 performed at a later time.

When whether a safety event has occurred is determined by the safety monitoring apparatus 20 based on the result of the second statistic, the safety monitoring apparatus 20 may provide the determination result to the user, for example, display the result to the user via the user interface 206, optionally, if it determines that a safety event has occurred, it may further provide the user with the information about the equipment within and/or outside the industrial control system 10 related to the safety event. Furthermore, it may also generate a safety event report for review by the user.

The description above is made by taking the obtained first data 301 including network flow as an example. For the case where the first data 301 comprises the equipment log of the equipment in the industrial control system 10, there will be the same principle for achieving the safety monitoring, for example, after obtaining the equipment log, the safety monitoring apparatus 20 may preprocess the equipment log first to identify and label the type of equipment log (safety log, application log, system log, operation log or the like), the type of equipment related to the equipment log, and perform a time statistic on at least one first statistic in the obtained equipment log based on the preset rules of the first characteristic, wherein the at least one first characteristic may include but is not limited to, the number of equipment logs, and the proportion of each log type in all equipment logs, or the like. The safety monitoring apparatus 20 provides the result 401 of the first statistic to a user, and the user will perform an operation on the result 401 of the first statistic. The safety monitoring apparatus 20, based on the operation 501 performed by the user, determines the range of the equipment log for the second statistic and performs the time statistics on at least one second characteristic of the equipment log within the range, wherein at least one second characteristic may include but is not limited to the ratio of sensitive operation in the log, the number of specific equipment in the log, the number of specific users in the log, and the number of specific times in the log or the like. The safety monitoring apparatus 20 performs a safety analysis based on the result of the second statistic, optionally provide the result 402 of the safety analysis to the user.

In the process of the safety monitoring performed by the safety monitoring apparatus 20, not only the first statistic but also the second statistic may be performed after the first data 301 is obtained, and the result of the second statistic may be recorded, but only the result 401 of the first statistic is provided to the user. After the user performed the result 401 of the first statistic to determine the range of the second data 302, the statistical result within the range selected by the user will be extracted from the recorded result of the second statistic as the result of the second statistic in the target time period 601. The first statistic and the second statistic may be continued, i.e., performing continuous statistics after obtaining the first data 301.

Alternatively, after obtaining the first data 301, the safety monitoring apparatus 20 may perform only the first statistic, and store the first data 301 or the related information about the first data 301, and then after the user performs the operation on the result 401 of the first statistic, perform the second statistic on the data within the range selected by the user, and use the statistic result as a result of the second statistic in the target time period 601. Wherein, the first statistic may be continued after the first data 301 is obtained while the second statistic is performed as needed based on the user's selection.

In the process of the safety monitoring method provided by the examples of the present invention, after the safety monitoring apparatus 20 provides the result 401 of the first statistic to the user in step S303, the user can determine based on their own experience or the like whether an abnormal behavior occurs in the industrial control system 10, with the user's determination not being limited to the preset rules, so it is possible to determine an abnormal behavior that has not occurred in the past. However, if the user determines preliminarily that there may be an abnormal behavior in the industrial control system 10, an operation may be performed on the result 401 of the first statistic, and the data range for further performing the second statistic may be selected to further perform an in-depth analysis on the possible abnormal behavior, thereby determining whether a safety event has occurred in the industrial control system 10. In the aforementioned Example 1, although there is an abnormal behavior in the industrial control system 10, the second statistic determines that no safety event occurs in the industrial control system 10; while in the aforementioned Example 2, after it is determined that there is an abnormal behavior in the industrial control system 10, the second statistic further determines that a safety event has occurred in the industrial control system 10. These safety events pose a safety threat to the industrial control system 10, and the user can further take safety measures to prevent threats resulting from the safety events.

The process of the safety monitoring method performed by the safety monitoring apparatus 20 is described above, where the process may be performed by the safety monitoring apparatus 20 provided in the examples of the present invention, or by another equipment or apparatus for performing safety monitoring in the industrial control system.

Figure 4:
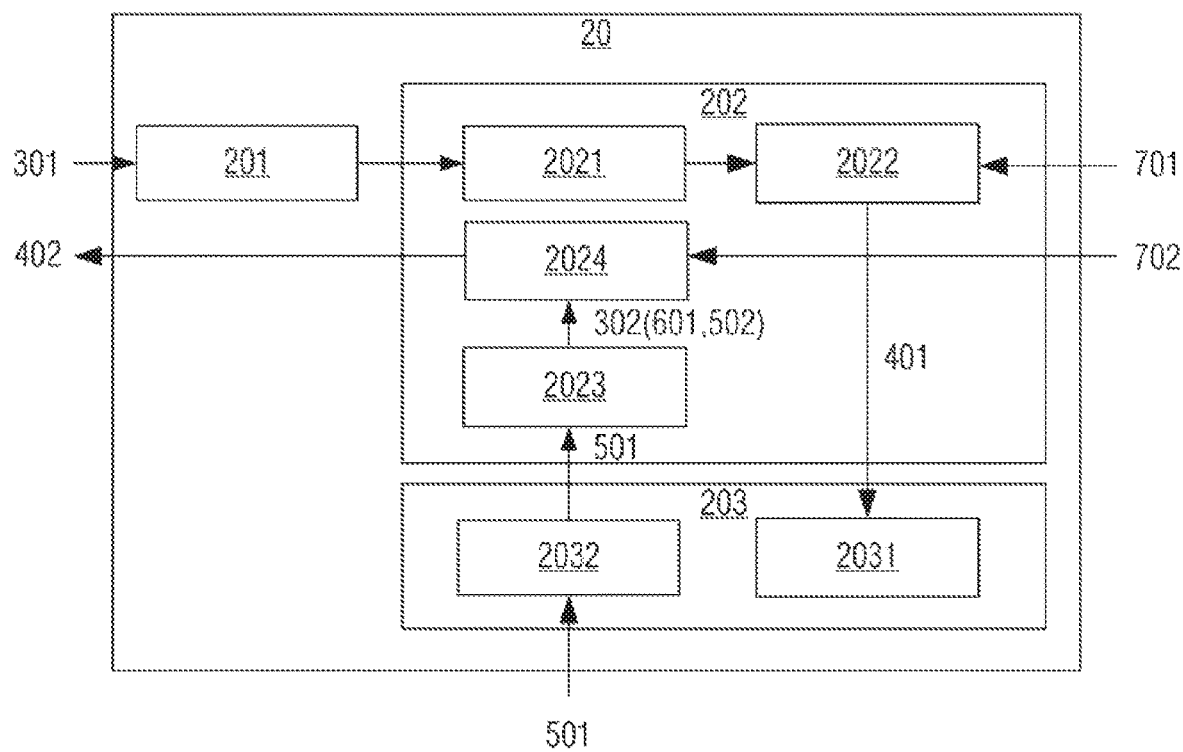
FIG. 4 is a schematic diagram of the structure a safety monitoring apparatus provided in an example embodiment of the present invention.

FIG. 4 shows a schematic diagram of the structure of a safety monitoring apparatus 20 provided in an example of the present invention. As shown in FIG. 4, the safety monitoring apparatus 20 can comprise:

a data obtaining module 201, configured to obtain first data 301, wherein the first data 301 is the data generated during the process of operating the industrial control system 10;

a data analyzing module 202, configured to perform the first statistics on the first data 301, wherein the first statistics comprise a time statistics performed on at least one first characteristic of the first data 301, a time statistics result of at least one first characteristic is used by a user to identify an abnormal behavior in the industrial control system 10; and a user interface module 203, configured to provide a result of the first statistic for the user, and obtain an operation 501 performed by the user on the result of the first statistic.

The data analyzing module 202 is further configured to determine, based on the operation 501, a target time period 601 related to the first statistic and the second data 302 satisfying a preset condition 502 in the first data 301; obtain a result of a second statistic in the target time period 601, wherein the second statistic comprises a time statistic performed on at least one second characteristic of the second data 302, and the time statistical result of at least one second characteristic is used by a user to analyze an abnormal behavior in the industrial control system 10; and based on the result of the second statistic in the target period 601, perform the safety analysis on the industrial control system 10.

Wherein each of the above modules may be deemed as a program module for the machine-readable code stored in at least one memory 204 as shown in FIG. 2, and be invoked by at least one processor 205 to perform the safety monitoring method provided in the example embodiments of the present invention. Each of the above modules can further be deemed as each functional module achieved by a combination of hardware and software, configured to achieve various functions related to performing the safety monitoring method for the safety monitoring apparatus 20. Each of the above modules can also be deemed as each functional module achieved by hardware, and be configured to achieve various functions related to performing the safety monitoring method for the safety monitoring apparatus 20, for example, pre-burning the control logic of each process related to the safety monitoring method to, for example, a Field-Programmable Gate Array (FPGA) chip or a Complex Programmable Logic Device (CPLD), on which the function of each of the above modules is achieved, with a specific implementation depending on the engineering practice.

Optionally, when providing the result 401 of the first statistic to a user, the user interface module 203 is specifically configured to display the result 401 of the first statistic to the user on a touchscreen, and when obtaining the operation 501 performed by the user on the result 401 of the first statistic, the user interface module 203 is specifically configured to obtain a touch operation performed, on the touchscreen, by the user on the displayed result 401 of the first statistic.

Optionally, when performing a safety analysis on the industrial control system 10 based on the result of the second statistic in the target time period 601, the data analyzing module 202 is specifically configured to compare the result of the second statistics in the target time period 601 with a result of the second statistic in at least one previous time period corresponding to the target time period 601; and determine, based on a comparison result, whether a safety event occurs in the industrial control system 10 in the target time period 601.

Optionally, when comparing the result of the second statistics in the target time period 601 with the result of the second statistics in at least one previous time period corresponding to the target time period 601, the data analyzing module 202 is specifically configured to determine, for each of the at least one second characteristics, the deviation level between the result of the second statistics in the target time period 601 and the result of the second statistics in at least one previous time period corresponding to the target time period 601. When determining, based on the comparison result, whether a safety event occurs in the industrial control system 10 in the target time period 601, the data analyzing module 202 is specifically configured to perform a weighted calculation on the deviation level corresponding to at least one second characteristic to obtain an overall deviation level, and if the overall deviation level is greater than a preset overall deviation level threshold, determine that a safety event occurs in the industrial control system 10 in the target time period 601, or otherwise, determine that no safety event occurs in the industrial control system 10 in the target time period 601.

Wherein, the data analyzing module 202 may comprise the following submodules:

a pre-processing submodule 2021 to achieve statistics on the first data 301, where the first data 301 may need to be preprocessed by the pre-processing submodule 2021, for example, identifying the type of network protocol used for the data, the type of the equipment log, the equipment related to the equipment log, or the like;

a first statistic submodule 2022 that may perform statistics based on the statistical rule 701 of the preset first characteristic;

a data range determining submodule 2023 that may determine the range of the second data based on the operation 501 obtained by the user interface module 203; and a second statistic submodule 2024 that may perform statistics based on the statistical rule 702 of the preset second characteristic, obtain a result of the second statistic in the target time period 601, and perform, based on the result of the second statistic in the target time period 601, the safety analysis on the industrial control system 10, optionally, it is possible to output the result 402 of the safety analysis.

Wherein, the user interface module 203 may comprise the following submodules:

a statistical result providing submodule 2031, configured to provide the user with the result 401 of the first statistic obtained by the first statistical submodule 2022; and an operation obtaining submodule 2032, configured to obtain the operation 501 of the result 401 of the first statistic performed by the user, and send the information of the operation 501 to the data range determining submodule 2023 in the data analyzing module 202. The range information of the determined second data 302 includes, for example, the target time period 601 and the preset condition 502.

Figure 5:
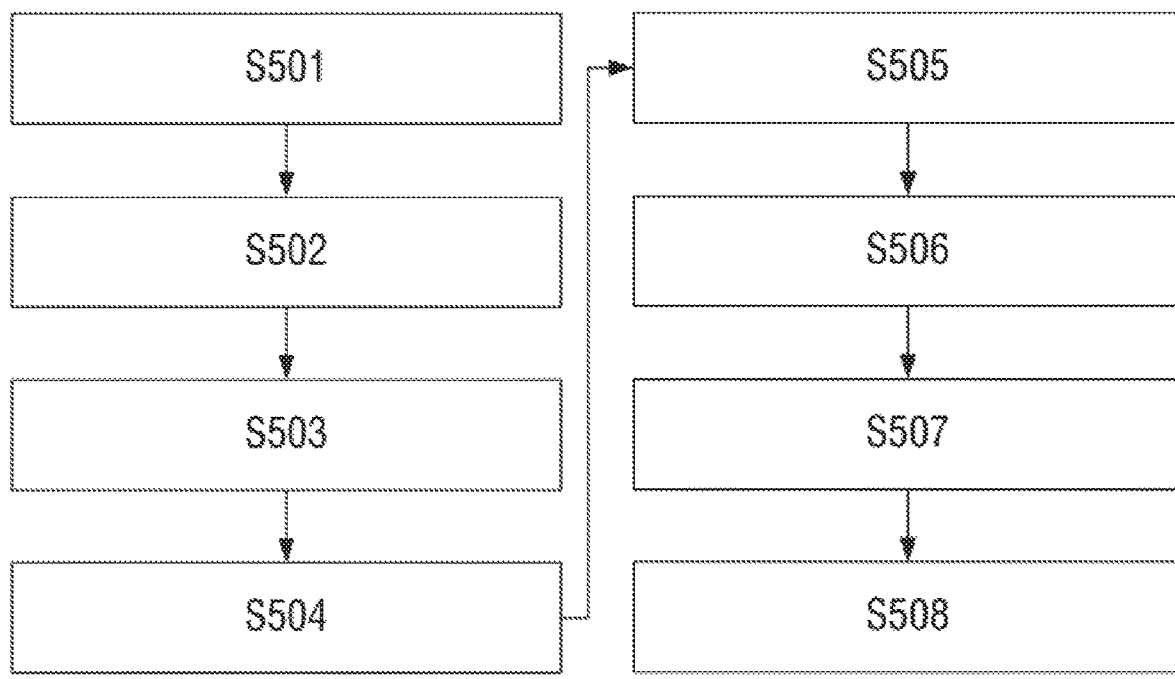
FIG. 5 is a flowchart of a process for performing safety monitoring using a safety monitoring method provided in an example embodiment of the present invention.

An example in Examples of the present invention is provided below. As shown in FIG. 5, the process of the example may comprise the following steps:

In the example, a malicious terminal is illegally connected to the industrial control system 10, and accesses the PLC for port scanning, where some key files in the PLC are downloaded by File Transfer Protocol (FTP) and some parameters in the PLC are modified by the Modbus protocol.

In the example, the following steps can be taken in detecting the safety event:

S501: obtaining the network flow in the industrial control system 10;

S502: pre-processing the obtained network flow, and identifying the type of network protocol used by the network flow, such as Internet Control Message Protocol (ICMP), Hypertext Transfer Protocol (HTTP), FTP and Modbus or the like;

S503: performing analysis on the pre-processed network flow, and obtaining based on the pre-configured characteristic rule base, a first characteristic (the rate of flow of each network protocol in the flow rate and network flow) and a second characteristic (retransmission rate, packet loss rate and ratio of sensitive operation in industrial control);

S504: performing time-based first statistic on the ratio of flow of each network protocol in the flow rate and the network flow, respectively and displaying them in a Graphical User Interface (GUI), and performing the time statistic on the retransmission rate, packet loss rate and ratio of sensitive operation in industrial control and record them, respectively;

S505: displaying the result of the first statistic on the GUI, and receiving an operation performed by the user on the GUI.

If a user, for example, a safety expert or system administrator, finds that the flow rate of a certain network protocol network flow is abnormal during a certain period of time, he/she may draw a circle or a box to select the time period of the network protocol;

S506: identifying the operation entered by the user, and determining the time period and the network protocol type selected by the user, thereby selecting the part of the obtained network flow that the user wants to make an in-depth analysis of. It is assumed here that the user has selected two network protocol types, i.e., FTP and Modbus;

S507: obtaining a result of the second statistic within the user's selection range; and S508: comparing the deviation level between the result of the second statistic and the statistical result of the previous corresponding time period, for example, the same time period in each of previous weeks, or the same time period of previous few days, or the same time period of previous few months. The overall deviation level can be obtained by using the aforementioned weighted calculation method, and if the overall deviation level is greater than the threshold, determine that a safety event has occurred in the industrial control system 10, and a network attack may occur. The analysis result may be provided to the user. Furthermore, the user can also access to the result of the second statistic and the related information, such as the equipment involved, to further perform safety analysis.

Example embodiments of the present invention further provide a machine-readable medium having stored thereon machine-readable instructions that, when executed by a processor, causes the processor to perform any of the aforementioned methods. Specifically, they can provide a system or an apparatus equipped with a machine-readable medium having stored thereon a software program code that achieves the functions of any of the above examples, and causes a computer or processor of the system or apparatus to read and execute machine-readable instructions stored on the machine-readable medium.

In this case, the program code itself read from the machine-readable medium may achieve the functions of any of the above examples, such that the machine-readable code and the machine-readable medium storing the machine-readable code constitute a part of the present invention.

Examples of machine-readable media include floppy disks, hard disks, magneto-optical disks, optical disks (such as CD-ROM, CD-R, CD-RW, DVD-ROM, DVD-RAM, DVD-RW and DVD+RW), magnetic tape, nonvolatile memory card and ROM. Optionally, the program code can be downloaded from a server computer or a cloud via the communication network.

In summary, the example embodiments of the present invention provide a safety monitoring method and a safety monitoring apparatus that can be used for safety monitoring of an industrial control system, wherein the result of the first statistic is provided to a user so that the user can identify an abnormal behavior in the industrial control system, and provide, based on the operation performed by the user on the result of the first statistic, the second statistic of part selected by the user so that the user can perform an in-depth analysis on the abnormal behavior in the industrial control system and determine whether a safety event occurs. The example embodiments of the present invention may achieve the following advantages:

1) providing the preliminary result of the first statistic to a user so that the user can easily and quickly identify an abnormal behavior based on the result of the first statistic;
2) allowing the user to perform an operation on the result of the first statistic, and to select the target time period and set the condition for data selection, so that the user can enter the operation on the GUI with a gesture that is simple and easy to perform;
3) the examples of the present invention combine the experience as a safety expert or system administrator and the capacity of automatic analysis on the safety monitoring apparatus, which can effectively improve the accuracy of the industrial control system in determining the safety event; and
4) the user can also perform the analysis on the identified abnormal behavior based on the status of the current industrial control system, where the user can select the target time period and the data range, providing the flexibility of the user selection and improving the response efficiency of the safety event, so that effective responses can be made against sudden network attacks.

What needs to be explained is that not all steps and modules are required for the above processes and system structure diagrams, and some steps or modules may be omitted as per actual needs. The sequence of performing each step is not fixed and may be adjusted as needed. The system structure described in the aforementioned examples may be either a physical structure or a logical structure, i.e., some modules may be achieved by the same physical entity, or some modules may be achieved by multiple physical entities or jointly by some components in multiple pieces of stand-alone equipment.

In each of the above examples, the hardware units can be implemented either mechanically or electrically. For example, a hardware unit can comprise permanently a specific circuit or logic (such as a specific processor, FPGA or ASIC) to complete the corresponding operations. The hardware unit may further comprise a programmable logic or circuitry (such as a general-purpose processor or other programmable processors) that can be temporarily set by software to perform the corresponding operations. The specific implementations (a mechanical mode, or a specific permanent circuit, or a temporarily set circuit) can be determined based on the considerations of costs and time.

The present invention has been shown and described in detail with reference to the attached drawings and the preferred examples thereof, but the present invention is not limited to these disclosed examples, and more examples of the present invention that may be known by those skilled in the art based on several examples described above, and be obtained by combining the code review means in different examples described above, are also within the scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A safety monitoring method for an industrial control system, the method comprising:
    obtaining first data, the first data being data generated during a process of operating the industrial control system;
    performing first statistics on the first data, the first statistics including time statistics compiled on at least one first characteristic of the first data, time statistic results of at least one first characteristic being usable by a user to identify an abnormal behavior in the industrial control system;
    providing a result of the first statistics to the user, wherein providing a result of the first statistics includes displaying the result to the user on a touchscreen;
    obtaining an operation performed by the user on the result of the first statistics, wherein obtaining the operation performed by the user on the result of the first statistics includes obtaining a touch operation performed on the touchscreen by the user on the displayed result of the first statistics, wherein the operation is performed by the user when an abnormal behavior in the industrial control system is suspected, and wherein the operation is used for selecting a data range for further analysis;
    determining, based on the operation, a target time period related to the first statistics and second data satisfying a preset condition in the first data;
    obtaining a result of second statistics over the target time period, the second statistics including time statistics compiled on at least one second characteristic of the second data, and a time statistic result of the at least one second characteristic is used by the user to analyze the abnormal behavior in the industrial control system; and
    performing a safety analysis on the industrial control system based on the result of the second statistics in the target time period, wherein the at least one second characteristic is for an in-depth analysis of identified abnormal behavior and is different from the at least one first characteristic.

2. The method of claim 1, wherein the performing of the safety analysis, based on the result of the second statistics in the target time period, on the industrial control system includes
comparing the result of the second statistics in the target time period with a result of the second statistics in at least one previous time period corresponding to the target time period; and determining, based on a result of the comparing, whether a safety event happens in the industrial control system in the target time period.

3. The method of claim 2, wherein
the comparing of the result of the second statistics in the target time period with a result of the second statistics in at least one previous time period corresponding to the target time period includes
determining, for each of at least one second characteristic, a deviation level between the result of the second statistics in the target time period and the result of the second statistics in at least one previous time period corresponding to the target time period; and
wherein the determining, based on the result of the comparing, whether a safety event happens in the industrial control system in the target time period, includes
performing a weighted calculation on the deviation level corresponding to at least one second characteristic, to obtain an overall deviation level; and
determining, upon the overall deviation level being relatively greater than a preset overall deviation level threshold, that a safety event happens in the industrial control system in the target time period, or otherwise determining that no safety event happens in the industrial control system in the target time period.

4. A non-transitory machine-readable medium, on which program code sections of a computer program are stored, the program code sections being executable by a processor of a controller to, when the program code sections are executed by the processor,
obtain first data, wherein the first data is data generated during a process of operating an industrial control system;
perform first statistics on the first data, wherein the first statistics include a time statistic performed on at least one first characteristic of the first data, a time statistic result of at least one first characteristic being usable by a user to identify an abnormal behavior in the industrial control system;
provide a result of the first statistics for the user, wherein providing the result of the first statistics includes displaying the result to the user, the processor is specifically configured to display the result of the first statistics to the user on a touchscreen, and obtain an operation performed by the user on the result of the first statistics when an abnormal behavior in the industrial control system is suspected, and wherein the operation is used for selecting the data range for further analysis, wherein obtaining the operation performed by the user on the result of the first statistics, the processor is specifically configured to obtain a touch operation performed, on the touchscreen, by the user on the displayed result of the first statistics; the processor is further configured to:
determine, based on the operation, a target time period related to the first statistics and second data satisfying a preset condition in the first data;

obtain a result of second statistics in the target time period, wherein the second statistics include a time statistic performed on at least one second characteristic of the second data and a time statistic result of the at least one second characteristic being usable by the user to analyze the abnormal behavior in the industrial control system; and
perform a safety analysis on the industrial control system based on the result of the second statistics in the target time period, wherein the at least one second characteristic is for an in-depth analysis of identified abnormal behavior and is different from the at least one first characteristic.

5. The non-transitory machine-readable medium of claim 4, wherein upon performing the safety analysis on the industrial control system based on the result of the second statistics in the target time period, the program codes sections are specifically configured to:
compare the result of the second statistics in the target time period with a result of the second statistics in at least one previous time period corresponding to the target time period; and
determine, based on a comparison result, whether a safety event happens in the industrial control system in the target time period.

6. The non-transitory machine-readable medium of claim 5, wherein:
upon comparing the result of the second statistics in the target time period with the result of the second statistics in at least one previous time period corresponding to the target time period, the program code sections are specifically configured to:
determine, for each of the at least one second characteristic, a deviation level between the result of the second statistics in the target time period and the result of the second statistics in at least one previous time period corresponding to the target time period; and
upon determining, based on a result of the comparing, whether a safety event happens in the industrial control system in the target time period, the program code sections are specifically configured to:
perform a weighted calculation on the deviation level corresponding to at least one second characteristic, to obtain an overall deviation level; and
determine, upon the overall deviation level being relatively greater than a preset overall deviation level threshold, that a safety event happens in the industrial control system in the target time period, or otherwise, determine that no safety event happens in the industrial control system in the target time period.

7. A safety monitoring apparatus for an industrial control system, comprising:
at least one memory, configured to store machine-readable code; and
at least one processor, configured to invoke the machine-readable code, to perform safety monitoring including:
obtaining first data, the first data being data generated during a process of operating the industrial control system,
performing first statistics on the first data, the first statistics including time statistics compiled on at least one first characteristic of the first data, time statistic results of at least one first characteristic being usable by a user to identify an abnormal behavior in the industrial control system, providing a result of the first statistics to the user, wherein providing a result of the first statistics includes displaying the result to the user via a touchscreen, obtaining an operation performed by the user on the result of the first statistics, wherein obtaining the operation performed by the user on the result of the first statistics includes obtaining a touch operation performed on the touchscreen by the user on the displayed result of the first statistics, wherein the operation is performed by the user when an abnormal behavior in the industrial control system is suspected, and wherein the operation is used for selecting a data range for further analysis, determining, based on the operation, a target time period related to the first statistics and second data satisfying a preset condition in the first data, obtaining a result of second statistics over the target time period, the second statistics including time statistics compiled on at least one second characteristic of the second data, and a time statistic result of the at least one second characteristic is used by the user to analyze the abnormal behavior in the industrial control system, and performing a safety analysis on the industrial control system based on the result of the second statistics in the target time period, wherein the at least one second characteristic is for an in-depth analysis of identified abnormal behavior and is different from the at least on first characteristic.

* * * * *